(12) United States Patent
Zhang et al.

(10) Patent No.: US 8,799,141 B2
(45) Date of Patent: Aug. 5, 2014

(54) FRAMEWORK FOR IMPLEMENTING TRADE PREFERENCE AGREEMENTS

(75) Inventors: Eryi Zhang, Heidelberg (DE); Philippe Drouin, Sinsheim (DE); Jochen Thierer, Bruchsal (DE); Uwe Frankenhauser, Leimen (DE); Andreas Stier, Malsch (DE)

(73) Assignee: SAP AG, Walldorf (DE)

( * ) Notice: Subject to any disclaimer, the term of this patent is extended or adjusted under 35 U.S.C. 154(b) by 134 days.

(21) Appl. No.: 13/305,249

(22) Filed: Nov. 28, 2011

(65) Prior Publication Data

US 2013/0138545 A1    May 30, 2013

(51) Int. Cl.
*G06Q 40/00*    (2012.01)
(52) U.S. Cl.
USPC ............... 705/37; 705/36; 705/35; 705/26
(58) Field of Classification Search
USPC .......................................... 705/35, 36 R, 37
See application file for complete search history.

(56) References Cited

U.S. PATENT DOCUMENTS

| | | | | |
|---|---|---|---|---|
| 6,021,397 A * | 2/2000 | Jones et al. | ................. | 705/36 R |
| 6,996,539 B1 * | 2/2006 | Wallman | ..................... | 705/36 T |
| 2001/0042785 A1 * | 11/2001 | Walker et al. | ................. | 235/379 |
| 2002/0120546 A1 * | 8/2002 | Zajac | .............................. | 705/37 |
| 2004/0117302 A1 * | 6/2004 | Weichert et al. | ................ | 705/40 |

OTHER PUBLICATIONS

Classified Ad 3—No Title, New York Daily Times (1851-1857); Oct. 28, 1852; ProQuest Historical Newspapers: The New York Times (1851-2009) p. 5.*

* cited by examiner

*Primary Examiner* — Hani M Kazimi
*Assistant Examiner* — Clement B Graham
(74) *Attorney, Agent, or Firm* — Kenyon & Kenyon LLP (57) ABSTRACT

A preference management framework allows for the management of vendor-based vendor declarations and of vendor declarations for customer's purposes, preference determination based on preference agreements, the provision of statements regarding the preference eligibility of goods based on preference determinations, and the printing of several preference related documents according to the relevant agreements. The framework is flexible enough for users to easily develop their own preference schemes for new preference agreements. Users may first define (or modify) their responsible areas for preference management by assigning (or removing) administrative units of a business to themselves. Then the users may begin the preference processing by choosing one of their assigned administrative units and any preference agreements relevant to that administrative unit may be automatically determined for possible following steps in preference processes which can now be started.

20 Claims, 11 Drawing Sheets

FRAMEWORK FOR IMPLEMENTING TRADE PREFERENCE AGREEMENTS

BACKGROUND

The growth of international trade over the last few decades has led to the creation of regional trade agreements like the North American Free Trade Agreement (NAFTA) or the European Union (EU). However, each cross-border transaction can involve complex tariffs and duties, cumbersome documentation requirements, and changing legal regulations for each new locality. Therefore, international trade presents both business opportunities and business-oriented technological challenges.

The pressure to minimize costs has led to product sourcing going global and represents one of the driving forces behind increased international trade. The reliance on global resources introduces additional possibilities for implementing automated systems that provide increased efficiency in varied import-export scenarios. One area that can benefit from a higher degree of automation is trade preference processing. Trade preferences are usually elements of regional trade agreements that grant preferential customs treatment for goods from certain countries and geographical areas or for goods of certain types. Trade preferences allow exporters and importers to take advantage of reduced or zero import duties which increases the competitiveness of goods for sale because the customer has to pay less customs duties.

For example, if goods are exported from a member state of a first regional trade agreement to another member state of the regional trade agreement or to a member state of a second regional trade agreement which includes trade preferences for goods originating from member states of the first trade agreement then the exported goods may incur reduced customs duties if the exporter can demonstrate that the goods originate from a member state of the first regional trade agreement. As a consequence of such trade preferences, businesses may need to determine and certify the origin of the goods they import or export.

The origin of goods such as raw materials may be easy to establish, however this is not the case for manufactured goods. Such goods may consist of a large number of individual parts originating from various vendors in different regions. In order to determine whether such goods are eligible for trade preferences or not, it may be necessary to examine the origin of each individual part. The manufacturer of the good may request so-called vendor declarations from the vendors that deliver the individual parts in order to establish the origin of each individual part. A vendor declaration is a document that certifies that one or more parts delivered by a particular vendor originate from a particular region (or, in the alternative, that the parts are of a certain type) such as NAFTA or the EU. By evaluating the vendor declarations for each of the individual parts of a manufactured good, the manufacturer may determine whether or not the good will be eligible for trade preferences.

The concept is simple—import duty rates vary depending on what percentage of the manufactured good originates in the sending country. In practice, however, trade preference processing can be highly complex and time-consuming—each business must have written declarations from its suppliers as to the composition of the components and subassemblies of their manufactured goods. Trade preference processing according to the framework described herein can help automate this entire process.

SUMMARY OF THE INVENTION

A preference management framework offers options for preference processing like the management of vendor-based vendor declarations and of vendor declarations for customer's purposes, preference determination based on preference agreements and standardized products or order-related configurable products, the provision of a statement about the preference eligibility of goods based on preference determination, and the printing of several preference related documents according to the relevant agreements and using various technologies. The framework is flexible enough for users, depending on their business needs, to run complete preference processes or to run individual steps of the process.

The framework is also flexible enough for users to easily develop their own preference scenarios for any new preference agreements. In this development process, users may carry out some customizing steps for the new agreements, like defining of preference indicators for the agreements, new rule sets for new agreements, linked preference rules for the preference determination, and setting of agreement-dependent printing of various documents.

The framework facilitates preference processing by making use of modularization in the four following areas: separation between the agreement specific (external) and the framework (internal) representation of preference status (e.g. whether the goods satisfy a specific preference requirement) and preference indicators (e.g. whether a vendor declaration exists for the goods), separation of rule sets (the internal representation of a preference scheme mapping the external values to the internal values, for example, for a specific preference agreement such as NAFTA) for different preference situations, separation of preference determination and preference administration and rule set-dependant control settings for documents used in preference management.

The framework optimizes the preference processes by focusing on administrative units within a business which manage branches of the business (e.g. plants) located in one country or country group of a respective rule set or agreement. Users working for certain administrative units of a business may access all of the information and functionality relevant to their preference processing needs automatically according to the framework's system settings. In a first step, the users may be presented (via a suitable display) with information regarding administrative units of a business assigned to the user and may have the option to define or modify (via a suitable input device) their responsible areas for preference management by modifying the assignment of administrative units to themselves. That is, the users can define and use favorites (the favorite administrative units they want to use in their day to day work) in order to run personalized preference processes. Then the users can start the preference processes by choosing one of their assigned administrative units. Since administrative units within the framework collect all information about the plants where specific goods are manufactured (from Plant Data 25 in ERP system 20), including the location of the plants, the related agreements or rule sets relevant to an administrative unit may be easily determined.

DETAILED DESCRIPTION

Embodiments of the present invention will now be described in detail, by way of example only, with reference to the accompanying drawings in which identical or corresponding parts/features are provided with the same reference numerals in the figures.

Figure 1:
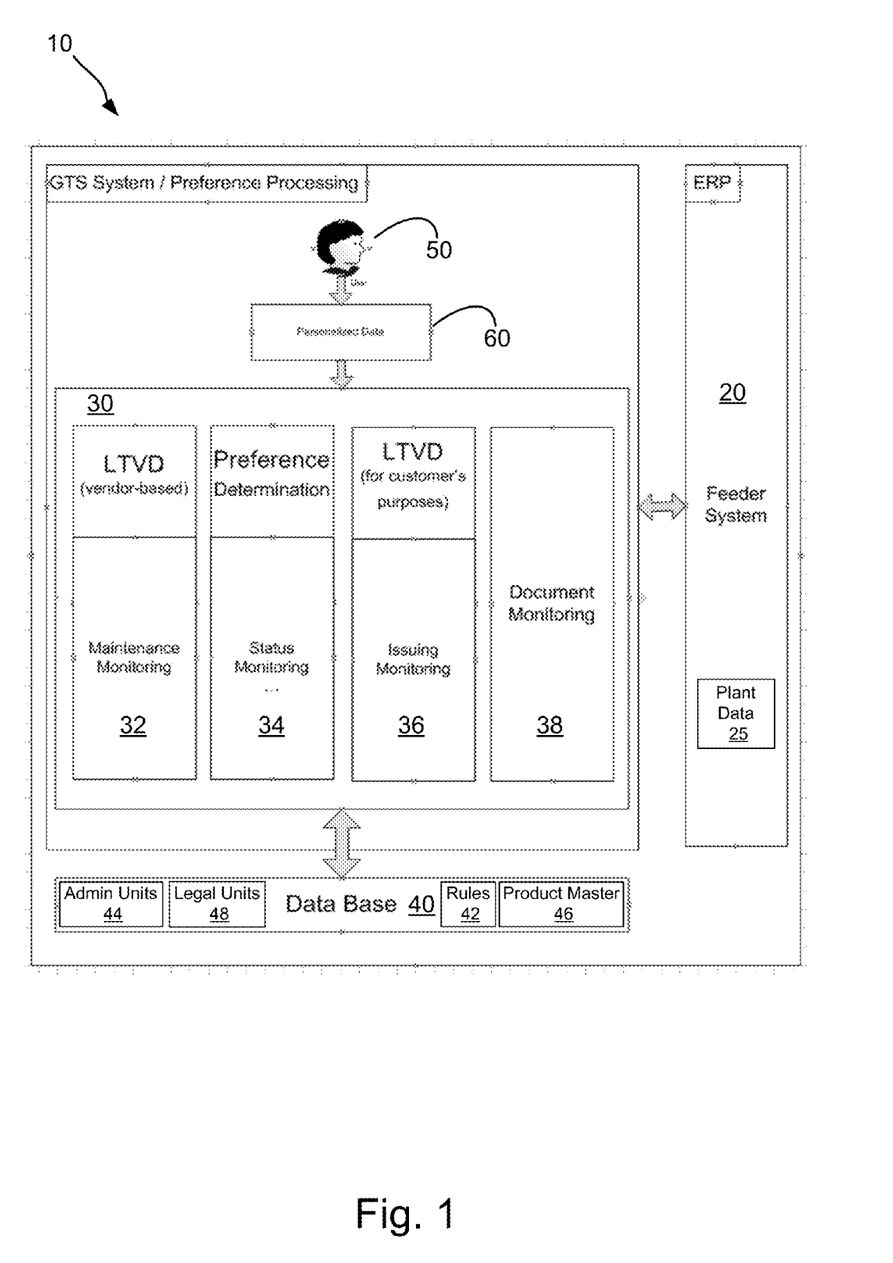
FIG. 1 shows an example system according to the present invention.

FIG. 1 shows an example system 10 for managing trade preferences including an existing business system (or systems), for example ERP (Enterprise Resource Planning) system 20, that is connected to a separate trade services system, for example GTS (Global Trade Services) system 30 and a data base 40.

GTS system 30 handles the implementation of trade preferences based on information received from ERP system 20 (Feeder System), data base 40 and user input 60 from user 50, e.g. data regarding the business credentials of the user are input by the user via any appropriate i/o device(s) available for GTS system 30. GTS system 30 includes an LTVD (vendor-based) function module 32, a Preference Determination function module 34, an LTVD (for customer's purposes) function module 36, and a Document Monitoring function module 38.

LTVD (Long-term Vendor Declaration) is a term used herein to describe a document that allows for the verification of the origin of a specific good. A vendor may use a vendor declaration to confirm that a specific good meets all of the conditions for preferential treatment in a preference agreement regarding the origin and/or nature of the specific good. LTVD (vendor-based) function module 32 handles the monitoring and processing of vendor-based LTVDs for a given vendor or good. The GTS system 30 uses purchase order data and goods receipt data from ERP system 20 in order to start the process for requesting or sending reminders for LTVDs from vendors. LTVD (vendor-based) function module 32 then tracks which vendor declarations you have requested (or sent reminders for) from a particular vendor or for a particular good during a particular period. LTVD (vendor-based) function module 32 may also display (via any appropriate i/o device(s) available for GTS system 30) a detailed list of all existing preference statements (i.e. external representations of preference indicators) from the received long-term vendor declarations and the graphical representation of the preference statements lets the user 50 assess the preference situation for a particular good or vendor instantly. Furthermore, for the processing of LTVDs, the user 50 can choose a period for processing like 'current year', or 'next year', or any another chosen period of time.

Preference Determination function module 34 handles the determination of the preference status of a particular good (e.g. whether the goods satisfy a specific preference requirement of a preference rule set 90 modeled in the system). A particular rule set 90 represents preference rules for a or some particular preference agreements, for example NAFTA. In order to simplify the following description, we consider the preference rule set with two meanings: the preference rules and the preference agreements belonging to the rule set. The preference schemes may be based on various preference statuses and preference indicators which may be represented in two ways: the internal (or the technical) representation and the external (or official) representation. The values for the internal or technical representation are predefined in the GTS system 30 in a read only form. So the internal values are agreement independent and may be used for internal processing. The values for the external or official representation are agreement specific. The external values may be defined or modified by the user 50 via user input 60 in order to customize the rule sets 90. The semantic significance of the values may be implemented for a specific preference scheme via mappings between the respective representations (external to internal representation and internal to external representation). These mappings are part of the preference scheme and may also be stored in preference rule set 90. User 50 may define or modify the respective mappings between external and internal values in order to customize the rule sets 90 modeled by the system. The User 50 may define or modify preference rules 42 via user input 60 or the rules 42 may be obtained from a data provider. Preference determination may be based on a specific preference rule set 90 as modeled according to preference rules 42 in data base 40 for particular agreements.

Preference determination function module 34 is based on Bills of Matetials (BOM). A BOM is a list of the raw materials, sub-assemblies, intermediate assemblies, sub-components, components, parts and the quantities of each needed to manufacture a manufactured good (product). A BOM can define products as they are designed (engineering bill of materials), as they are ordered (sales bill of materials), as they are built (manufacturing bill of materials), or as they are maintained (service bill of materials). In preference determination, the GTS system 30 incorporates all the BOM components transferred to it from the ERP system 20. The GTS system 30 may perform preference determination for all the transferred BOMs or the user may limit the BOMs for preference determination according to alternative BOMs and BOM usage, and/or perform a worst-case analyses for preference determination.

The Preference Determination function module 34 may determine a threshold value (e.g. a percentage of BOM parts) to specify the preferential origin of products that are of mixed origin under a specific preference rule set 90 as modeled according to preference rules 42. The Preference Determination function module 34 may compare the threshold value for preferential treatment with a BOM to determine if the product defined by the BOM is eligible for preferential treatment under the specific preference rule set 90 as modeled according to preference rules 42.

The Preference Determination function module 34 may aggregate data according to a worst-case principle for user selected products in one user selected legal unit 80 or administrative unit 70 of a business. A branch of a business may be, for example, a plant. Information about plants where specific goods are manufactured, including the location of the plants is stored in Plant Data 25 in ERP system 20. A legal unit 80 of a business is an organizational unit that corresponds to a branch of the business as per the information stored in Legal Units 48 in data base 40. Each Legal Unit 80 is located in one country or country group and assigned to a user selected administrative unit 70 within the business. Each administrative unit 70 is an organizational unit which manages branch (es) of the business, e.g. a plant or a plant group, and may be assigned to a user 50 for processing. First user 50 may select from a list of administrative unit 70 assigned to user 50. Then user 50 may display from a list of preference rule sets 90 (e.g. agreements) and a list of legal units 80 relevant to a selected administrative unit 70. The determination of which legal units 80 are relevant for a particular administrative unit 70 is based on information in Admin Units 44 in data base 40. The determination of which rule sets 90 are relevant for a particular administrative unit 70 is based on information in Admin Units 44 and Legal Units 48 in data base 40 which is mapped from the plant data 25 in the ERP system 20. The information regarding which administrative units 70 are assigned to a particular user 50 may also be stored in Admin Units 44. The user 50 may decide at which organizational level the system is to determine the threshold value for preference determination between a preference model for plant-based preference determination (i.e. legal unit) and a preference model for cross-plant preference determination (i.e. a group of legal units). The Preference Determination function module 34 then performs preference determination for the BOMs within the selected legal unit 80 or administrative unit 70 and aggregates the results for all the BOMs for the selected product and the selected legal unit 80 or administrative unit 70. The GTS system 30 may record the aggregated results with a time stamp for the selected product in Product Master 46 in data base 40. Also the determined logs may be recorded in data base 40 for audit purposes. The results of the preference determination may also be displayed to the user 50.

LTVD (for customer's purposes) function module 36 is available after the user 50 has determined the preference eligibility of selected products, for example by aggregation of long-term vendor declarations from the user 50's vendors by comparing the threshold value to the BOM or to the prices of sales documents for the selected product. The LTVD (for customer's purposes) function module 36 may issue long-term vendor declarations to the user 50's customers. In this process, the LTVD (for customer's purposes) function module 36 determines all products that are eligible for preference (in the selected legal unit 80 or administrative unit 70), as well as all customers that purchase these products and that have been defined via user input 60 for receiving long-term vendor declarations. It is, of course, possible to change the selected administrative unit 70 to another one of the administrative units 70 assigned to the user 50 according to the information in Admin Units 44 in data base 40 and then choose legal units 80 an preference rule sets 90 relative to the newly selected administrative unit 70.

Document Monitoring function module 38 handles communication in the area of managing vendor declarations, including communication with business partners about materials involved in any transactions relevant for preference processing, e.g. vendor-based vendor declarations or vendor declarations for customer's purposes. This communication can be paper-based, be represented by mails or supported as a scenario for sending or receiving vendor declarations. The monitoring should display the various communication steps in a preference process (e.g. if a communication step was executed successfully and with which medium it was sent/received, etc).

Figure 2:
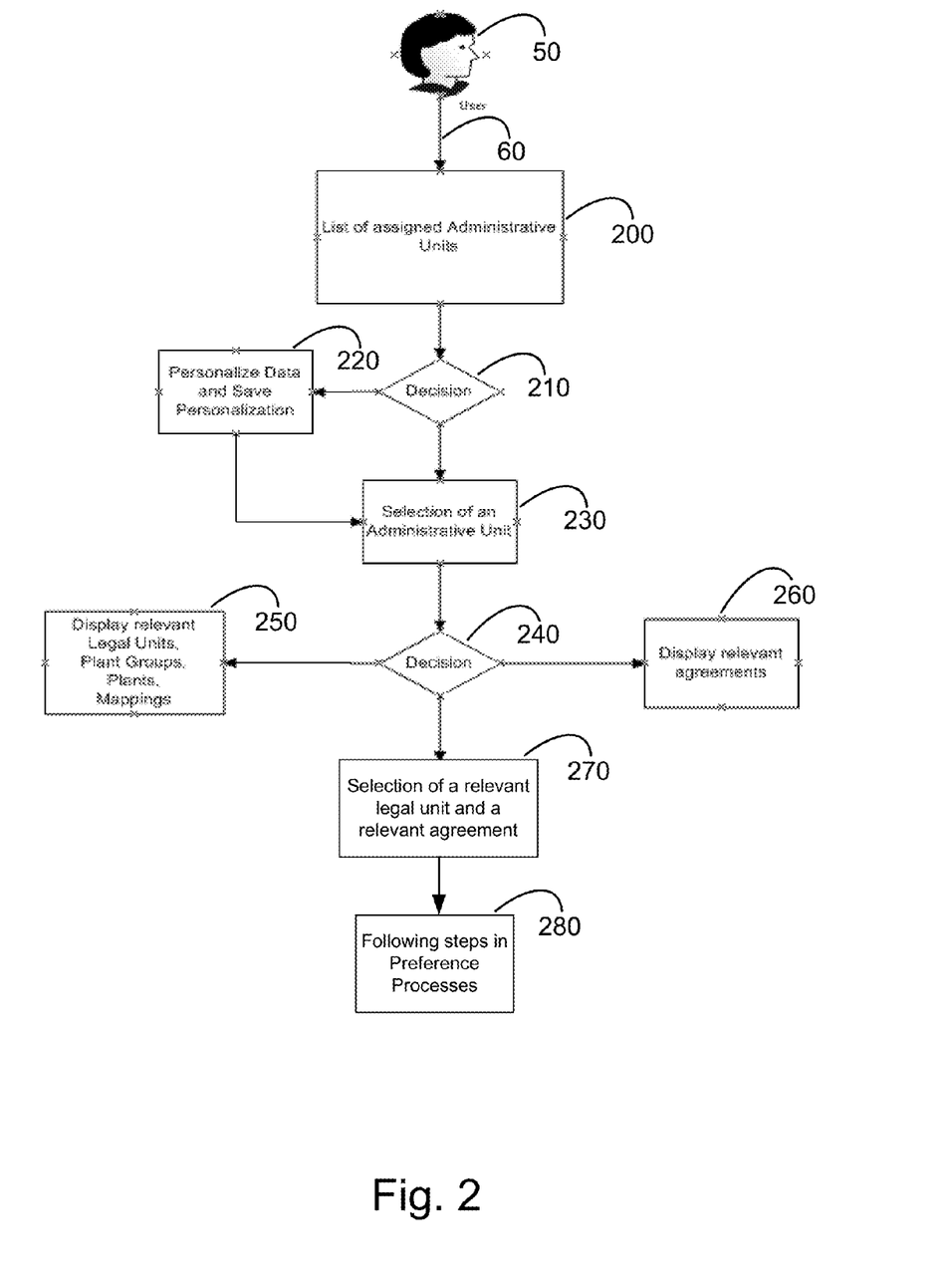
FIG. 2 shows a flow chart for an example method according to the present invention.

FIG. 2 shows a flow chart for an example embodiment of a method for managing trade preferences. In step 200 a list of administrative units 70 assigned to user 50 is displayed for user 50, via any appropriate i/o device(s), based on user input 60 input by user 50 via any appropriate i/o device(s). In step 210 the user 50 may decide, via user input 60, to proceed to either a) step 220 "Personalize Data and Save Personalization" which allows user 50 to assign administrative units to the user 50 or remove them from the user 50 in Admin Units 44 in data base 40; or b) step 230 "Selection of an Administrative Unit" which allows the user 50 to select from the list of administrative units assigned to user 50.

If an administrative unit assigned to user 50 was selected in step 230, then in step 240 information regarding the legal units 80 of the business relevant to the selected administrative unit 70 (according to Admin Units 44) are displayed for user 50 in step 250 "Display relevant Legal Units"; and information regarding the preference agreements (i.e. rule sets) relevant for a selected administrative unit 70 (according to Admin Units 44) is displayed for user 50 in step 260 "Display relevant agreements". In step 270 "Selection of a relevant legal unit and a relevant agreement" the user 50 may select one (or more) relevant legal unit 80 of the business and one (or more) relevant preference rule sets 90 (e.g. agreement) from those displayed in steps 250 and 260 above. In step 280 "Following steps in Preference Processes" the user 50 may proceed to the next steps for preference processing for the selected relevant legal unit 80 of the business and relevant preference rule set 90, for example, processing of vendor-based long term vendor declarations, determination of preference status for selected products, processing of long-term vendor declarations for customer's purposes or document monitoring/processing, each described more fully herein.

The following steps in the preference processing proceed according to the selected legal unit 80 of the business and the selected preference rule set 90 chosen by a user 50 from the displayed legal units 80 and rule sets 90 that are relevant to a previously selected administrative unit 70 that is chosen by user 50 from the displayed administrative units 70 that are assigned to user 50.

The administrative unit 70 is defined by assigning to it the organizational data from the legal units 80 which it manages. The assignment of legal units 80 to administrative units 70 may be modified or defined by user 50 in Admin Units 44.

Preference rule sets 90 relevant to an administrative unit 70 may be determined according to the geographical dependencies (countries or the rule set 90 and countries of the legal units 80). This implicit assignment 'rule set to administrative unit' builds the basis for the next steps in preference management.

As far as the assignment of legal units 80 to administrative units 70 is concerned, further checks may also be made:

A unique assignment of a legal unit 80 to an administrative unit 70: This means that a branch of a business (e.g. a plant or a plant group) shall only be managed by one administrative unit 70, not by several of them;

A unique country group for legal units 80 in a respective rule set 90: This means an administrative unit 70 shall only manage the plants that are located in one country group of a respective rule set 90; and A unique number system for the rule sets 90 in one type of rule set (A or B): This means an administrative unit 70 can group legal units in which different rule sets 90 and possibly also different rule set types (A or B, based on NAFTA or based on EU) are assigned. For example, for an administrative unit located in Mexico (MX), we have the agreements MXEU and NAFTA. Two different rule sets and also two different rule set types are assigned to those agreements.

Figure 3:
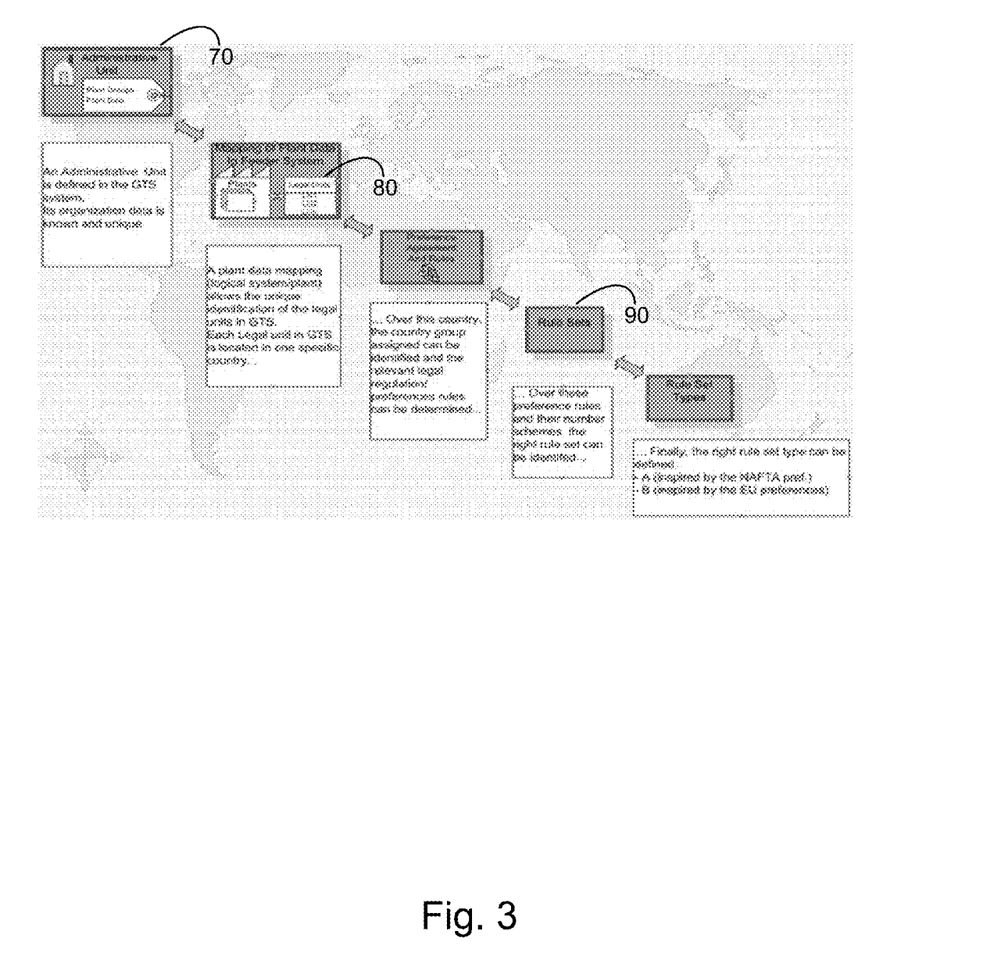
FIG. 3 shows the relationship between the administrative units of a business and the rule sets representing the relevant preference rules or agreements according to the present invention.

FIG. 3 illustrates the relationship between the administrative units 70 of a business and the rule sets 90 (internal representation) representing the relevant preference rules or agreements (external representation). There are currently two different types of rule sets available for Preference Processing in GTS system 30: A and B. The difference between the two rule set types A and B is that the procedures used in the determination of the preference status are different. So, if a preference rule or agreement is to be involved in preference processing in GTS system 30, it may first be assigned to one of the existing types of rule set A or B.

The following graph shows an example list of predefined preference procedures available in GTS system 30 and the corresponding assignments of each to a rule set type:

| Preference Procedure | Type A | Type B |
|---|---|---|
| Third Country Check | X | X |
| Tariff Shift | X | X |
| No Heading Change | | X |
| HS Heading Check | X | X |
| 50-50 Check | | X |
| Regional Value Content | X | |
| Condition | X | X |

The assignment of a preference rule or agreement to a rule set type is not done directly but over a rule set 90 which is assigned to a rule set type during its creation. Furthermore, a number system needs to be defined when creating a rule set 90. The representation of the rule or agreement then refers to this number system. For example, the preference agreement NAFTA can be represented by using rule set type A and the preference agreements in EU can be represented by using rule set type B.

A rule set 90 is assigned to one of the rule set types (e.g. A or B) defined in the system. The rule sets 90 allow for an internal representation of the right preference rules or agreements to be used in a given context over a scheme for preference indicators.

A preference scheme representing the relationship between external and internal preference indicators (e.g. vendor declarations) may be defined by the user 50. User 50 may define external preference status/indicators and then define the mapping of external values to internal values. Finally, assignment of the preference scheme to a specific preference rule set 90 in preference rules 42 allows the external preference indicators to be used for preference processing.

As mentioned above a branch of a business may be, for example, a plant. Information about plants, including the location of the plants, is stored in Plant Data 25 in ERP system 20. A legal unit 80 of a business is an organizational unit that corresponds to a branch (e.g. a plant as shown in FIG. 3) of the business as per the information stored in Legal Units 48 in data base 40. Each Legal Unit 80 is located in one country or country group and assigned to a user selected administrative unit 70 within the business. Each administrative unit 70 is an organizational unit which manages branch(es) of the business, e.g. a plant or a plant group, and may be assigned to a user 50. The determination of which legal units 80 are relevant for a particular administrative unit 70 is based on information in Admin Units 44 in data base 40. The determination of which rule sets 90 are relevant for a particular administrative unit 70 is based on information in Admin Units 44 and Legal Units 48 in data base 40 which are mapped from Plant Data 25 in ERP system 20. The information regarding which administrative units 70 are assigned to a particular user 50 may also be stored in Admin Units 44.

Figure 4A:
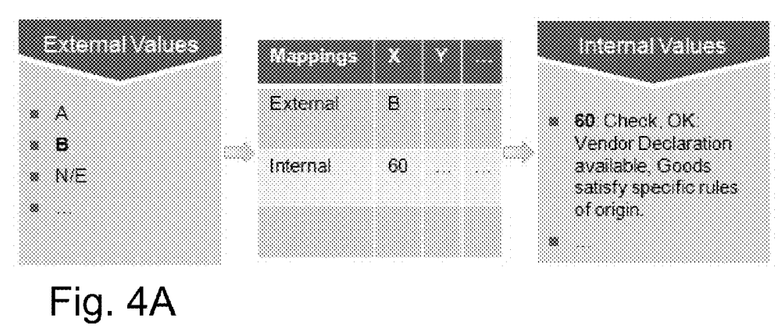
FIGS. 4A-4C show example mappings between external and internal values according to the present invention.
Figure 4B:
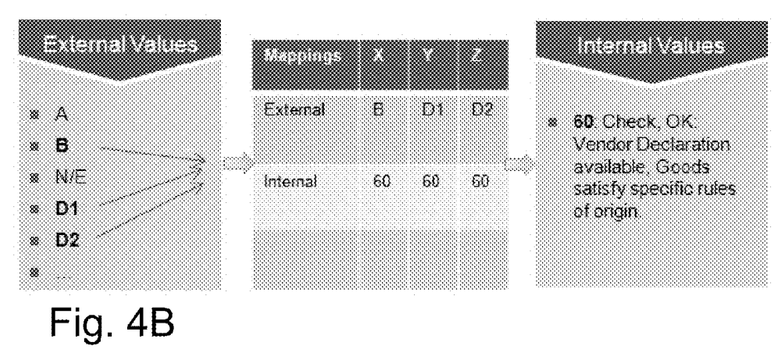
Figure 4C:
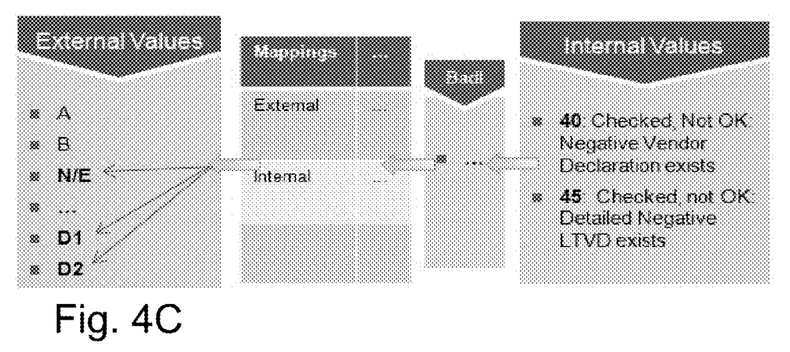

FIGS. 4A-4C show examples of the separation between internal and external representation of preference indicators and the associated mappings for a specific preference agreement as modeled according to preference rules 42. As mentioned above, the various preference status and preference indicators may be represented in two ways: the internal (or the technical) representation and the external (or official) representation. The internal values are agreement independent and may be used for internal processing. The values for the external or official representation are agreement specific and may be defined or modified by the user 50 via user input 60 in a customizing step. The semantic significance of the values may be obtained over the mappings between the respective representations (external to internal representation and internal to external representation). Therefore the user 50 can define or modify these values for the external (or official) representation and their respective mappings.

Mapping between the preference indicator (internal) and the preference status (internal) may include the two following directions:
1) Preference indicator to preference status: this mapping is needed for the aggregation of vendor declarations and the aggregation program will use this mapping; and
2) Preference status to preference indicator: this mapping is needed for issuing vendor declarations using the right indicator and will be used by the program for issuing vendor declarations for customer's purposes.

Mapping of preference indicators (external) to preference status (internal) may include a mapping that allows for the correct setting and representation of preference status information which is predefined in the system.

Several external values may be mapped to one single internal value with the mapping of external preference indicators to internal indicators still able to be clearly defined without ambiguity. For the mapping internal indicators to external indicators, if the same internal indicators are mapped to different external indicators then the program can be stopped or the user may be prompted to resolve the ambiguity via a user-exit function.

This situation is shown in the list below:

| External Indicator | Internal Indicator |
|---|---|
| D1 | ? <-- 60 |
| D2 | ? <-- 60 |
| B | ? <-- 60 |
| A | 66 |

A user-exit shall make it possible to set correct external preference status or preference indicators if a definite result may not be ensured by the GTS system 30 for a specific internal value, i.e. 60 in the example above. The user-exit function may also concern the determination of a preference status and indicator for a vendor declaration for customer's purposes, for instance for a status 'price dependant'.

The example of FIG. 4A shows a graphical representation of a set of Mappings including a mapping between the external value B from a set of External Values and the internal value 60 from a set of Internal Values.

The example of FIG. 4B shows a graphical representation of a set of Mappings including a mapping for Vendor-Based Vendor Declarations (under a rule set 90 modeling the NAFTA agreement): The external value B from a set of External Values including B, D1, D2, etc. . . . (received in a Vendor-Based Vendor Declaration) is mapped to the internal value 60 from a set of Internal Values for: Check, OK—Vendor declaration available: goods satisfy specific rules of origin." Parallel to this, other values, like D1 and D2 are also mapped to the internal value 60.

Figure 5:
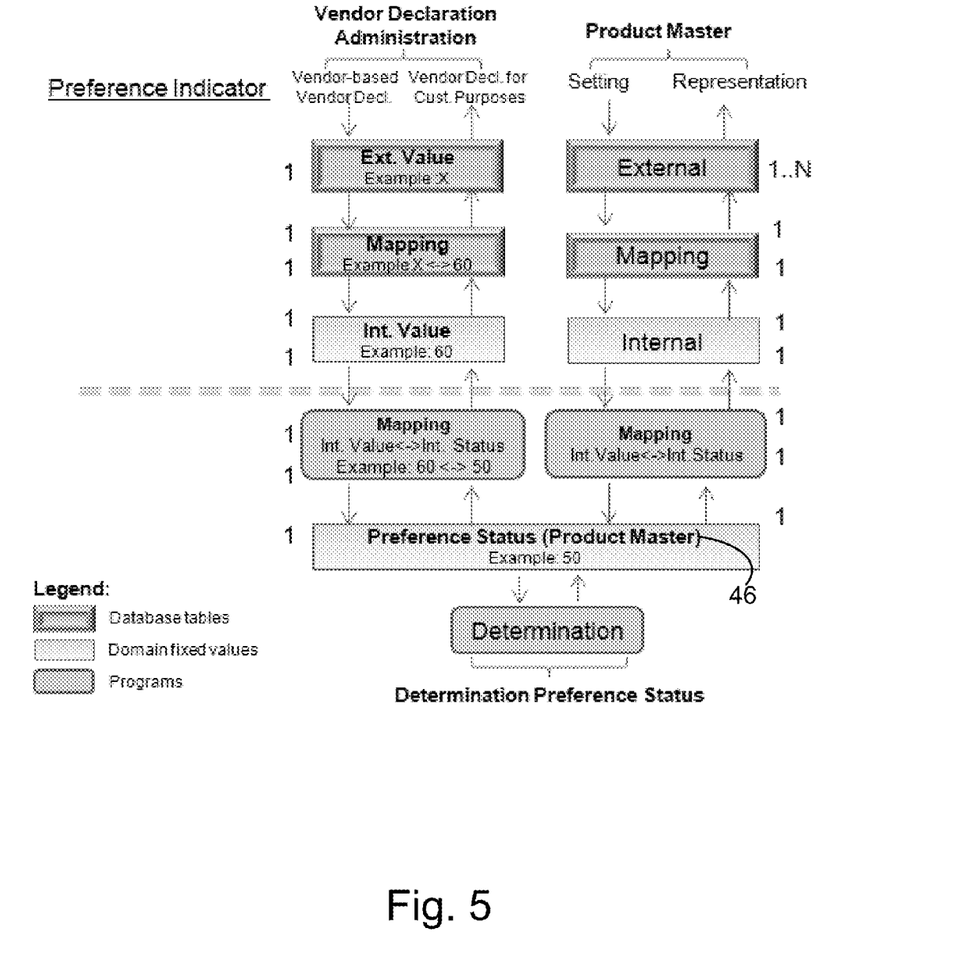
FIG. 5 shows the relationship between the Vendor Declaration Administration and the Product Master for determining preference status.

The example of FIG. 4C shows a graphical representation of a set of Mappings including a mapping for Vendor Declarations for Customer's Purposes (NAFTA): After a preference determination has been performed, the internal value 45 or 40 may be obtained. These internal values can be also mapped back to external Values B, D1, D2, N/E, etc. . . . , for the purpose of creating a Vendor Declarations for Customer's Purposes. However, in order to identify a unique external value for the mapping of an internal value, a user-exit may be used as mentioned above The example of FIG. 5 shows a graphical representation of a set of Mappings between the external and internal values for both the area of Vendor Declaration Administration and Product Master 46 for a particular product with example values. The factors influencing the internal preference status in this example are the aggregate values obtained from vendor declarations for a particular product. As illustrated in this example, information in the Product Master 46 can potentially lead to changes in the internal preference status, therefore this information needs to be correctly represented as external indicators in any preference scheme. Preference determination uses BOM components represented with internal preferences status therefore preference determination is not affected by Product Master 46 mappings.

Figure 6A:
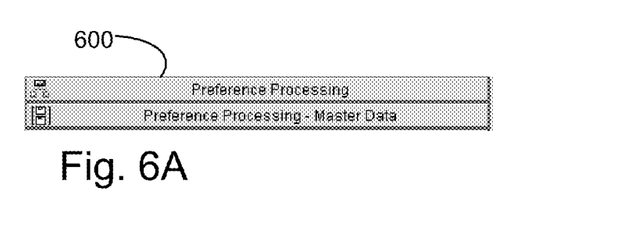
FIGS. 6A-6C show example screenshots of a preference processing user interface according to the present invention.

FIG. 6A shows an example screen shot of a user interface 600 for GTS system 30 including two separate areas: one for Preference Processing (top) and one for the Master Data (bottom). If user 50 selects "Preference Processing", the user 50 will be presented with a list of the administrative units 70 (as explained above, the administrative unit 70 represents a legal, self-contained organizational unit in the GTS system 30) of a business that are assigned to user 50. Then user 50 will have to select at least one of the administrative units 70 assigned to the user for processing—the system will then propose (according to the user's authorizations) the relevant data for preference processing activities accordingly.

Figure 6B:
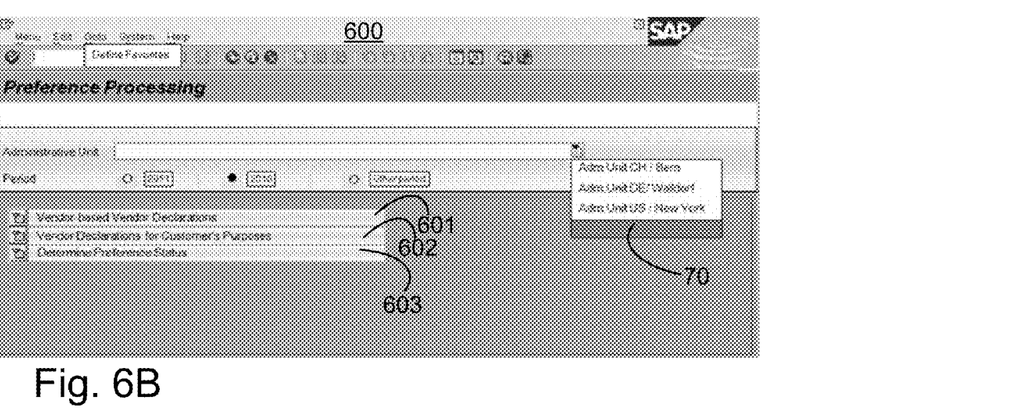

FIG. 6B shows an example screen shot of a user interface 600 for GTS system 30 including the first screen in any preference process (after selecting "Preference Processing" as explained above) which allows user 50 to define which administrative unit 70 they want to work with for preference processing. The list displayed as the selectable administrative units 70 may depend on the authorizations a respective user 50 may have within the business. This means that a user 50 may only be allowed to see/maintain data that they are authorized see/maintain. In case of a specific user 50 who has no authorization for the preference area, a corresponding warning message may be displayed. As shown FIG. 6B, user 50 may also have the possibility to define Favorites. Favorites are here the favorite administrative units 70 the user 50 would like to work with on a regular basis. The example user interface 600 for GTS system 30 also includes links 601, 602 and 603 for accessing LTVD (vendor-based) function module 32, LTVD (for customer's purposes) function module 36, and Preference Determination function module 34 respectively, for example to proceed to step 280 "Following steps in Preference Processes" of the method described above in the context of FIG. 2.

Figure 6C:
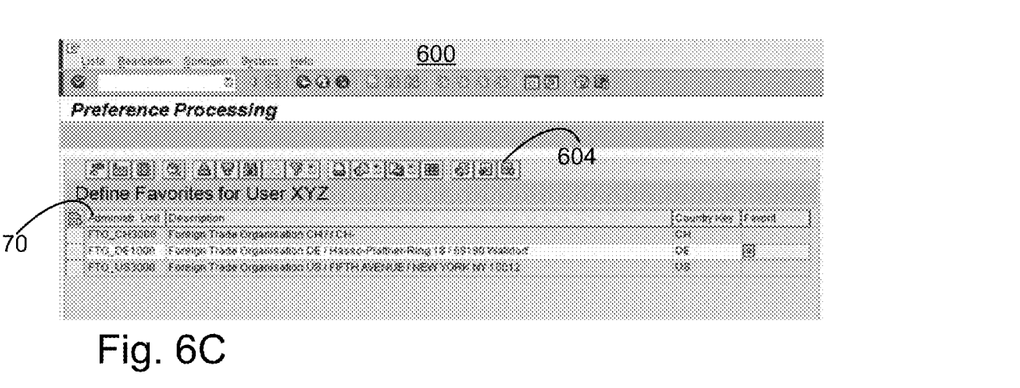

FIG. 6C shows an example screen shot of a user interface 600 for GTS system 30 including a display of the administrative units 70 available in the system for a given user 50. Administrative units 70 shall be selectable from a list and processing functions may be available to the user 50 depending on his authorizations. The user interface 600 shall display a list of predefined or personalized administrative units 70 available for the user 50 to be able to make his selection. In the case that no favorite was defined (yet), the user interface 600 for GTS system 30 shall display all administrative units 70 available to the user. In the present example of FIG. 6C, we can see (on the right hand side) that the second item in the list (administrative unit FTO_DE1000) was defined as a favorite. The other two items in the list were not.

Processing functions may be available to the user 50 depending on his authorizations once an administrative unit 70 has been selected. For example, the following functions may be available as icons 604 shown in FIG. 6C:

function to display legal units 80/plants relevant for an administrative unit 70;

function to display the relevant rule sets 90 for an administrative unit 70;

function for assigning/removing specific administrative units 70 from a user 50;

function to add/remove an administrative unit 70 as a favorite for a user 50; and function to select an administrative unit 70 in order to run through a preference process relevant to this administrative unit 70.

Figure 7:
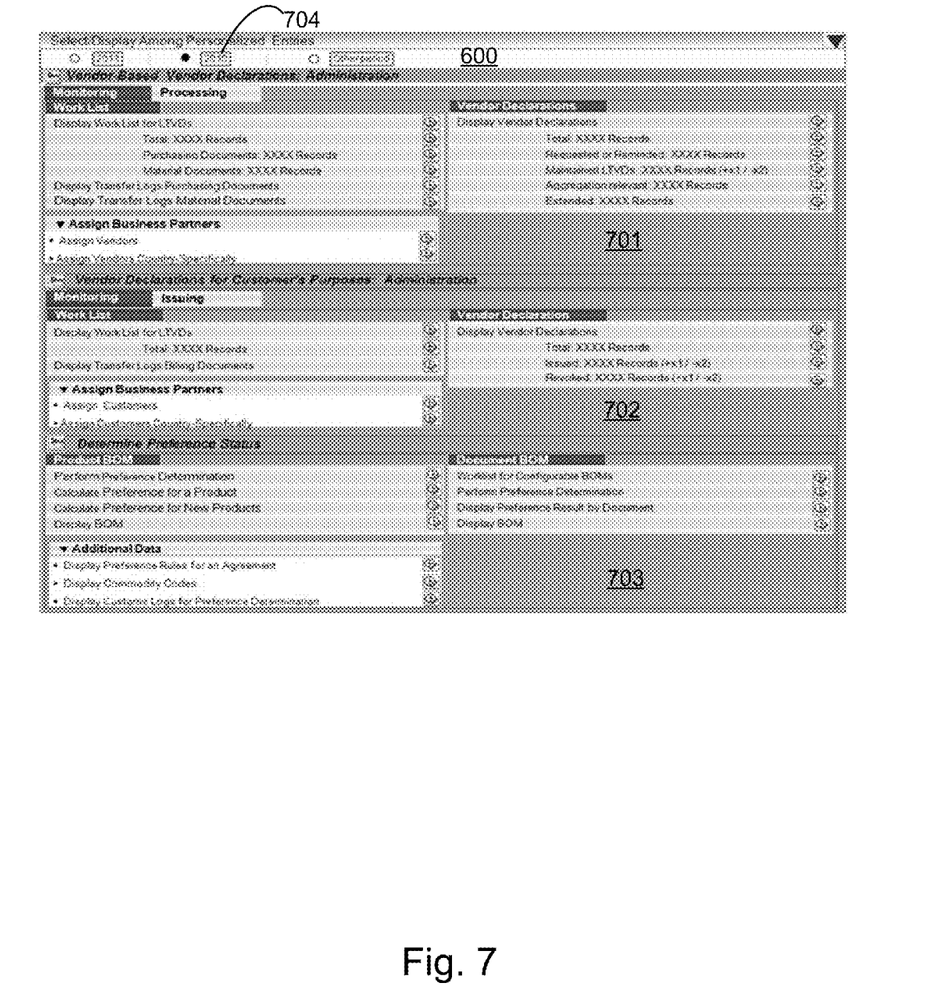
FIG. 7 shows an example screenshot of a preference processing user interface according to the present invention.

FIG. 7 shows an example screen shot of a user interface 600 for GTS system 30 including an initial screen for preference processing, once an administrative unit 70 is selected by a user 50. The 3 interface areas 701, 702 and 703 (accessible via links 601, 602 and 603 respectively as described above) for accessing LTVD (vendor-based) function module 32, LTVD (for customer's purposes) function module 36, and Preference Determination function module 34 respectively may be displayed on one screen. However, in order to improve visibility, it may be possible to expand and contract the 3 data areas mentioned above allowing users 50 to better focus on the selected area.

Before users 50 are able to manage LTVDs, they may also select a time period for which the processing will be performed. For example, a user 50 may choose from one of the following periods shown as icons 704 in FIG. 7 (where "2010" is selected) they want to work with:

the following year shall be available for selection;

the actual year shall be available for selection (may be set as the default); and "other period" shall be available for the user 50 to enter a specific period.

If the last option is selected two fields shall be displayed in order to enter a specific period (Date from and Date to).

Figure 8A:
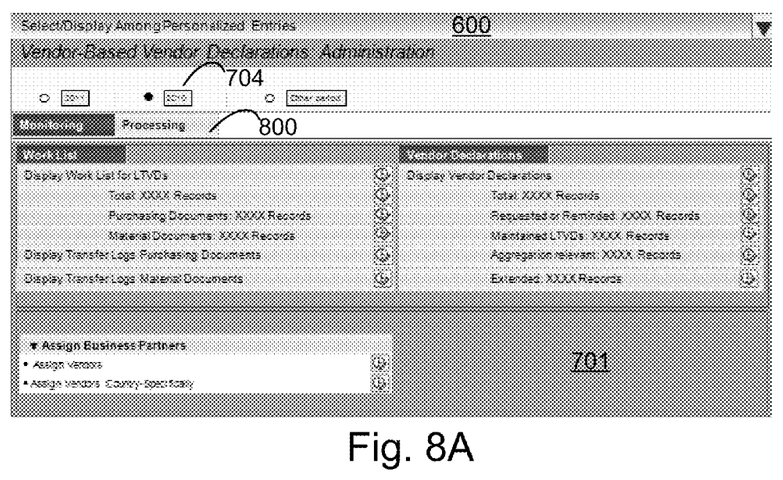
FIGS. 8A-8B show example screenshots of a vendor-based vendor declarations user interface according to the present invention.
Figure 8B:
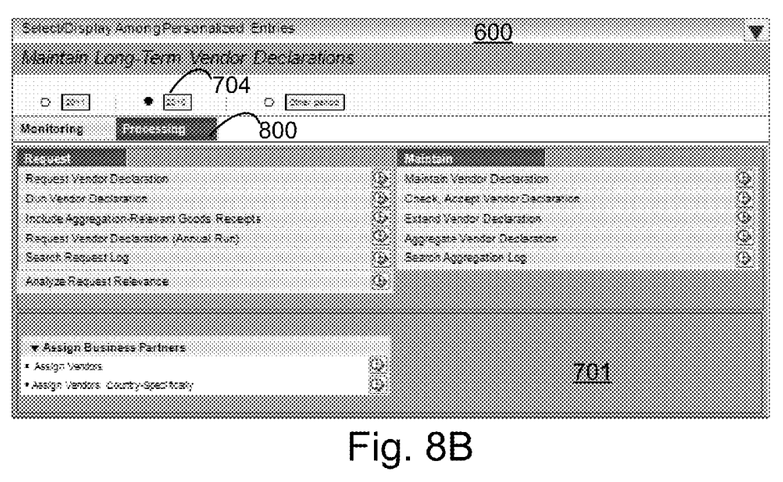

FIGS. 8A and 8B show example screenshots of the Vendor-based Vendor Declarations interface, for example, FIG. 8A shows an example screen shot of a user interface 600 for GTS system 30 including interface area 701 which further includes tabs 800 for Monitoring and Processing. The Monitoring has been selected (shown as darker) and therefore the: "Vendor-based Vendor Declarations: Administration" functionality is available. This functionality may be split in 2 main parts: Worklist and Vendor Declarations (left and right sides). The functions contained in the Worklist area may include: Display Worklist for LTVD, Total: xxxx Records, Purchasing Documents: xxx records, Material Documents: xx records, Display Transfer Logs Purchasing Documents and Display Transfer Logs Material Documents. The functions contained in the Vendor Declaration area may include: Display Vendor Declaration, Total: xxxx Records, Requested or Reminded: xxx records, Maintained LTVDs: xxx records, Aggregation-relevant: xx records and Extended: xx records. As mentioned above interface area 701 allows a user 50 to access to LTVD (vendor-based) function module 32 in order to perform some of the possible "Following steps in Preference Processes" of step 280 in the method described above in the context of FIG. 2. Some of the functions which may be included in interface area 701 may access Document Monitoring function module 38 (e.g. Display Vendor Declaration) in order to perform some of the possible "Following steps in Preference Processes" of step 280 in the method described above in the context of FIG. 2.

FIG. 8B shows an example screen shot of a user interface 600 for GTS system 30 including interface area 701 which further includes tabs 800 for Monitoring and Processing. The Processing has been selected (shown as darker) and therefore the: "Maintain Long-Term Vendor Declarations" functionality is available. This functionality may be split in 2 main parts: Request and Maintain (left and right). The functions contained in the Request area may include: Request Vendor Declaration, Dun Vendor Declaration, Include Aggregation-Relevant Goods Receipts, Request Vendor Declaration (Annual Run), Search Request Log and Analyze Request Relevance. The functions contained in the Maintain area may include: Maintain Vendor Declaration, Check, accept Vendor Declaration, Extend Vendor Declaration, Aggregate Vendor Declaration and Search Aggregation Log.

Interface area 701 in both FIGS. 8A and 8B includes a third part: Assign Business Partners (at bottom left). It may be possible to expand/explode this Assign Business Partners area if the functions contained in it are needed. If those functions are not needed, this area may remain contracted or closed. The functions contained in the Assign Business Partners Area may include: Assign Vendors and Assign Vendor Country-Specifically.

Figure 9:
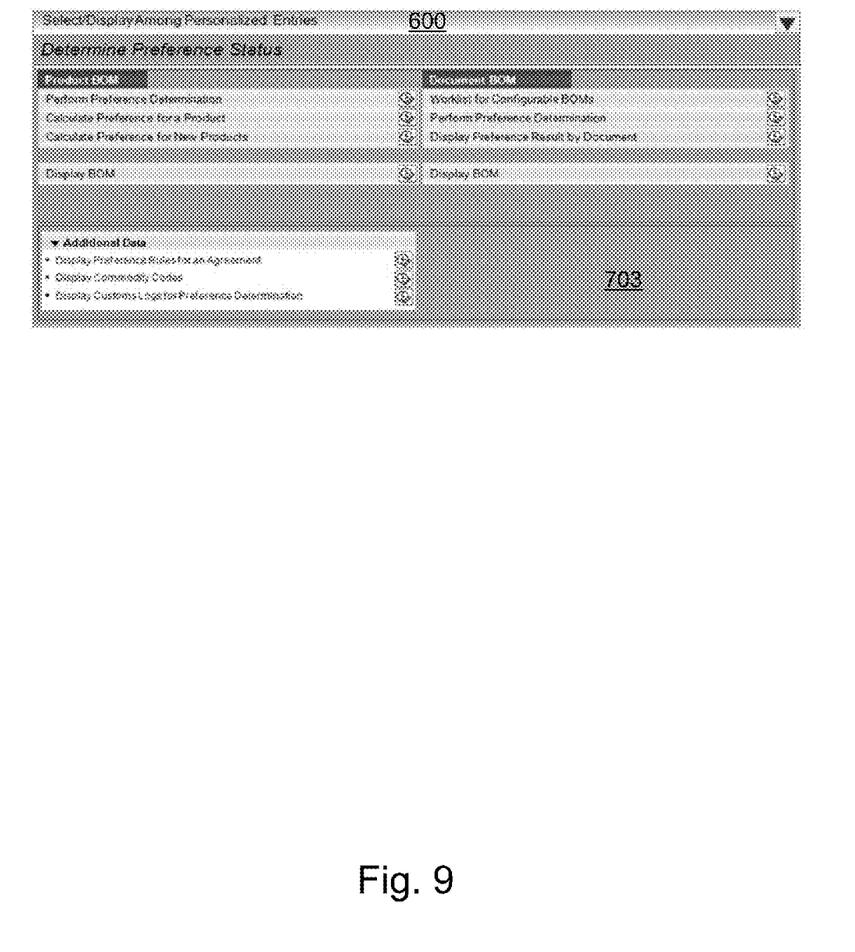
FIG. 9 shows an example screenshot of a determine preference status user interface according to the present invention.

FIG. 9 shows an example screen shot of a user interface 600 for GTS system 30 including interface area 703 which allows a user 50 to access to Preference Determination function module 34 in order to perform some of the possible "Following steps in Preference Processes" of step 280 in the method described above in the context of FIG. 2. This area may be split in two (2) main parts: Product BOMs and Document BOMs. The functions contained in the Product BOMs area may include: Perform Preference Determination, Calculate Preference for a Product, Calculate Preference for New Products and Display BOMs. The functions contained in the Document BOMs area may include: Worklist for Configurable BOMs, Perform Preference Determination, Display Preference Result by Document and Display BOMs. Some of the functions which may be included in interface area 703 may access Document Monitoring function module 38 in order to perform some of the possible "Following steps in Preference Processes" of step 280 in the method described above in the context of FIG. 2.

Interface area 703 in FIG. 9 also includes a third part: Additional Data (at bottom left). It may be possible to expand/explode this Additional Data area if the functions contained in it are needed. If those functions are not needed, this area may remain contracted or closed. The functions contained in the Additional Data area may include: Display Preference Rules for an agreement, Display Commodity Codes and Display Customs Log for Preference Determination.

Figure 10A:
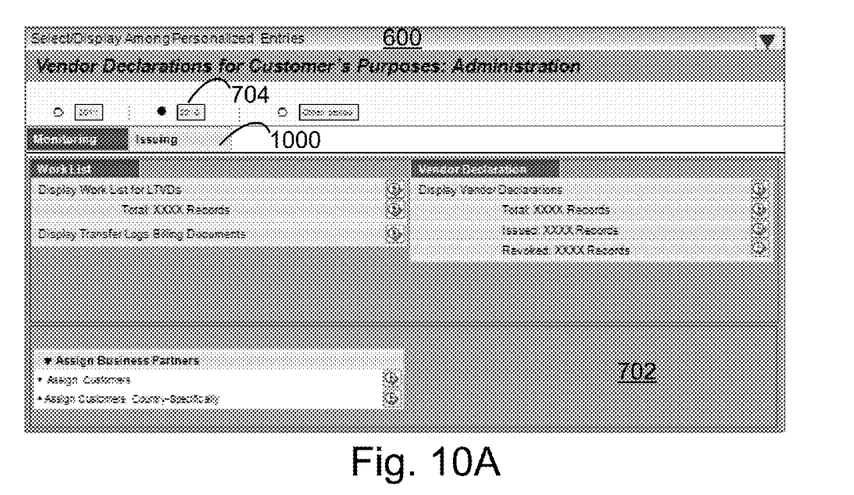
FIGS. 10A-10B show example screenshots of a vendor declaration for customer purposes user interface according to the present invention.
Figure 10B:
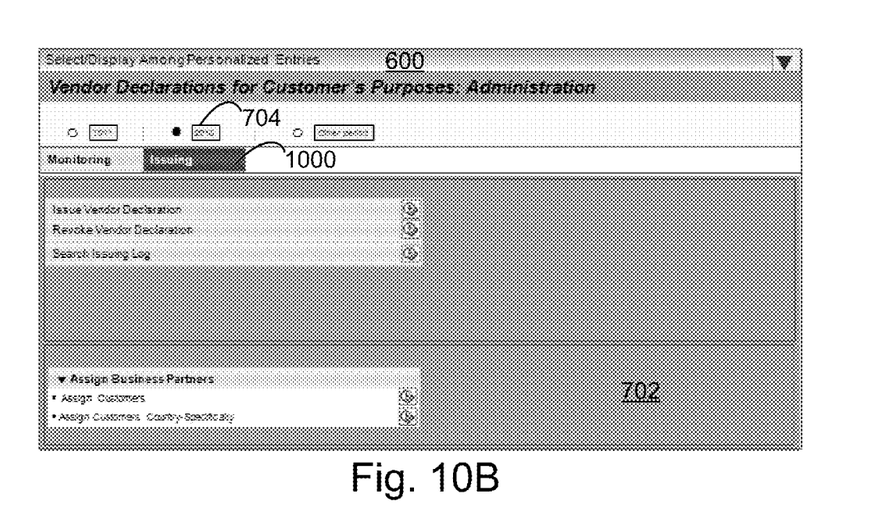

FIGS. 10A and 10B show example screenshots of the Vendor Declarations for Customer's Purposes: Administration interface, for example, FIG. 10A shows an example screen shot of a user interface 600 for GTS system 30 including interface area 702 which further includes tabs 1000 for Monitoring and Issuing. The Monitoring has been selected (shown as darker). The Monitoring functionality may be split in 2 main parts: Worklist and Vendor Declarations (left and right sides). The functions contained in the Worklist area may include: Display Worklist Vendor Declaration Worklist, Total: xxxx records and Display Transfer Log Billing Document. The functions contained in the Vendor Declaration area may include: Display Vendor Declaration, Total: xxxx records, Issued: xxx records and Revoked: xx records. As mentioned above interface area 702 allows a user 50 to access to LTVD (for customer's purposes) function module 36 in order to perform some of the possible "Following steps in Preference Processes" of step 280 in the method described above in the context of FIG. 2.

FIG. 10B shows an example screen shot of a user interface 600 for GTS system 30 including interface area 702 which further includes tabs 800 for Monitoring and Issuing. The Issuing has been selected (shown as darker). The Issuing functionality may include the functions: Issue Vendor Declaration, Revoke Vendor Declaration and Search Issuing Log.

Interface area 702 in both FIGS. 10A and 10B includes a third part: Assign Business Partners (at bottom left). It may be possible to expand/explode this Assign Business Partners area if the functions contained in it are needed. If those functions are not needed, this area may remain contracted or closed. The functions contained in the Assign Business Partners Area may include: Assign customers and Assign customers Country-Specifically.

Figure 11:
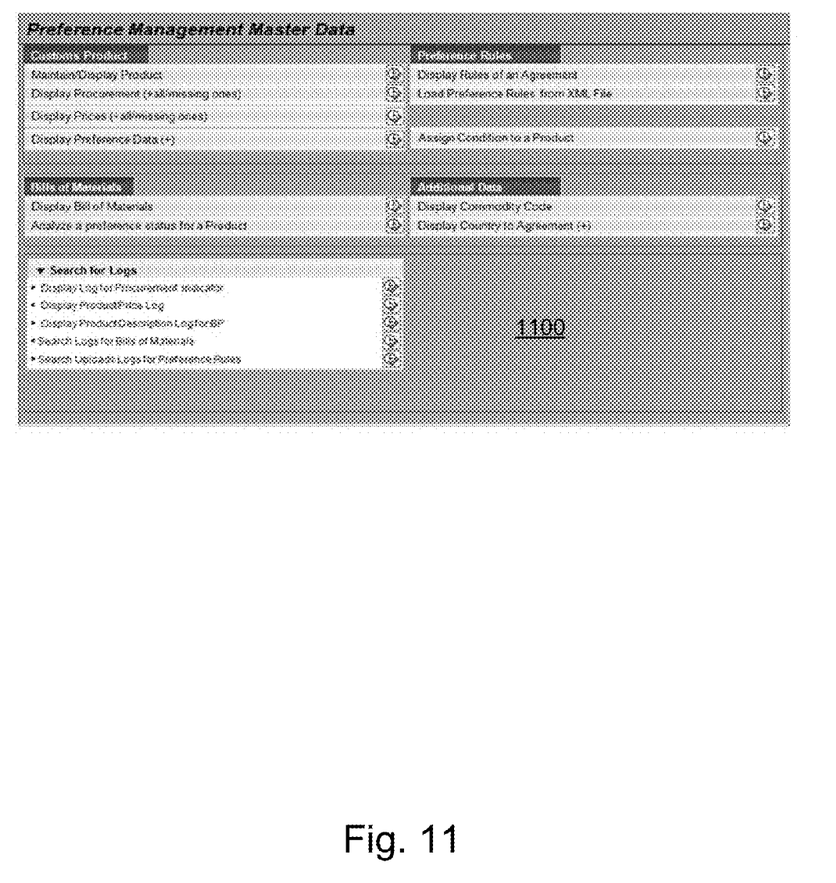
FIG. 11 shows an example screenshot of a preference management master data user interface according to the present invention.

A user 50 that chooses "Preference Processing—Master Data" (bottom choice) from the example user interface 600 of FIG. 6A may be presented with the example interface area 1100 shown in FIG. 11. This interface area 1100 includes the functionality for accessing/modifying data from throughout system 10. This access or modification may be performed according to the authorizations of a user 50. This interface area 1100 may be split in 4 main parts: Customs Products, Preference Rules, Bills of Materials and Additional Data.

The Customs Products (top left) area may include the following functions: Maintain/Display Products, Display procurement (all/missing ones), Display prices (all/missing ones) and Display preference data.

The Preference Rules (top right) area may include the following functions: Display Rules of an Agreement, Load Preference Rules from XML File and Assign Conditions to a Product.

The Bills of Material (middle left) area may include the following functions: Display Bills of Material and Analyze Preference Status of a Product.

The Additional Data (middle right) area may include the following functions: Display Commodity Code and Display Country to Agreement.

In addition to these four areas, there may be an area on the bottom left of interface area 1100 used to search for corresponding logs. It shall be possible to expand/explode this Search for Logs area if the functions it contains are needed. If those functions are not needed, the Search for Logs area may remain contracted or closed. The functions contained in the Search for Logs area may include: Display Log for Procurement Indicator, Display Product Price Log, Display Product Description Log for BP, Search Logs for Bills of Material and Search Upload Logs for Preference Rules.

Note that while embodiments of the present invention are described in the context of a fully functional computer system, those skilled in the art will appreciate that modules of the present invention are capable of being distributed in a variety of forms across a plurality of systems. Embodiments consistent with the invention may also include one or more programs or program modules on different computing systems running separately and independently of each other, while in their entirety being capable of performing business transactions in a large enterprise environment or in a "software on demand" environment. These programs or program modules may be contained on signal bearing media that may include: recordable type media such as floppy disks and CD ROMS, and transmission type media such as digital and analog communication links, including wireless communication links.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

We claim:

1. A method for managing trade preferences in business systems, comprising: performing the following using a processor;

receiving input from a user of a trade services system connected to at least one business system, displaying information regarding which administrative units of a business are assigned to the user of the trade services system based on the user's input and information from the at least one business system; modifying the information regarding which administrative units of the business are assigned to the user of the trade services system based on the input from the user; selecting at least one administrative unit of the business that is assigned to the user of the trade services system for preference processing based on the input from the user; displaying information regarding which legal units of the business and which trade preference rule sets of the trade services system are relevant to the selected administrative unit for preference processing; selecting at least one relevant legal unit of the business and one relevant trade preference rule set of the trade services system for preference processing based on the input from the user; and implementing a sequence of preference processing steps based on the selected legal unit of the business, the selected trade preference rule set and the input from the user.

2. The method of claim 1, wherein the sequence of preference processing steps includes monitoring or processing of vendor declarations for a selected vendor that supplies goods to the business.

3. The method of claim 2, wherein the monitoring or processing of vendor declarations includes requesting or sending reminders for vendor declarations from the selected vendor.

4. The method of claim 1, wherein the sequence of preference processing steps includes monitoring or processing of vendor declarations for a selected good traded by the business.

5. The method of claim 1, wherein the sequence of preference processing steps includes a determination of a preference status for a selected good.

6. The method of claim 5, wherein the determination of a preference status for the selected good is based on vendor declarations received from vendors who supply the business with the selected good and the selected preference rule set.

7. The method of claim 6, wherein the preference rule set includes internal values used for automatic preference processing and external values used to represent the selected preference rule set for preference analysis and document processing.

8. The method of claim 7, wherein the external values and the internal values are mapped to each other such that an external preference indicator is mapped to an internal preference indicator which is mapped to an internal preference status which is in turn mapped to an external preference status.

9. The method of claim 7, wherein the external values for representing the selected preference rule set or the mappings between the external and internal values are created or modified based on input from the user.

10. The method of claim 1, wherein the sequence of preference processing steps includes monitoring or processing of vendor declarations for a selected customer that is supplied with goods by the business.

11. The method of claim 10, wherein the monitoring or processing of vendor declarations includes sending vendor declarations to the selected customer.

12. The method of claim 1, wherein the monitoring or processing of vendor declarations for a selected customer is based on a determination of the preference status of a selected good supplied to the customer by the business.

13. A non-transitory computer-readable medium having stored thereon instructions adapted to be executed by a processor, the instructions which, when executed, cause the processor to perform a method for managing trade preferences in business systems, comprising: receiving input from a user of a trade services system connected to at least one business system, displaying information regarding which administrative units of a business are assigned to the user of the trade services system based on the user's input and information from the at least one business system; modifying the information regarding which administrative units of the business are assigned to the user of the trade services system based on the input from the user; selecting at least one administrative unit of the business that is assigned to the user of the trade services system for preference processing based on the input from the user; displaying information regarding which legal units of the business and which trade preference rule sets of the trade services system are relevant to the selected administrative unit for preference processing; selecting at least one relevant legal unit of the business and one relevant trade preference rule set of the trade services system for preference processing based on the input from the user; and implementing a sequence of preference processing steps based on the selected legal unit of the business, the selected trade preference rule set and the input from the user.

14. A system for managing trade preferences in business systems, comprising:

at least one business system including at least one processor; and a trade services system including at least one processor and at least one data base and connected to the at least one business system, the trade services system configured to:

receive input from a user of a trade services system connected to at least one business system, display information regarding which administrative units of a business are assigned to the user of the trade services system based on the user's input and information from the at least one business system;

modify the information regarding which administrative units of the business are assigned to the user of the trade services system based on the input from the user;

select at least one administrative unit of the business that is assigned to the user of the trade services system for preference processing based on the input from the user;

display information regarding which legal units of the business and which trade preference rule sets of the trade services system are relevant to the selected administrative unit for preference processing;

select at least one legal unit of the business and one trade preference rule set of the trade services system for preference processing based on the input from the user; and implement a sequence of preference processing steps based on the selected legal unit of the business, the selected trade preference rule set and the input from the user.

15. The system of claim 14, wherein the sequence of preference processing steps includes monitoring or processing of vendor declarations for a selected vendor that supplies a selected good to the business and the monitoring or processing of vendor declarations includes requesting or sending reminders for vendor declarations from the selected vendor.

16. The system of claim 14, wherein the sequence of preference processing steps includes a determination of a preference status for a selected good and the determination of a preference status for the selected good is based on vendor declarations received from vendors who supply the business with the selected good and the selected preference rule set.

17. The system of claim 16, wherein the preference rule set includes internal values used for automatic preference processing and external values used to represent the selected preference rule set for preference analysis and document processing.

18. The system of claim 17, wherein the external values and the internal values are mapped to each other such that an external preference indicator is mapped to an internal preference indicator which is mapped to an internal preference status which is in turn mapped to an external preference status.

19. The system of claim 14, wherein the sequence of preference processing steps includes monitoring or processing of vendor declarations for a selected customer that is supplied with goods by the business and the monitoring or processing of vendor declarations includes sending vendor declarations to the selected customer.

20. The system of claim 19, wherein the monitoring or processing of vendor declarations for a selected customer is based on a determination of the preference status of a selected good supplied to the customer by the business.

* * * * *